United States Patent [19]
Allaman et al.

[11] 4,267,754
[45] May 19, 1981

[54] CARCASS BAND END TRIMMER

[75] Inventors: Michael C. Allaman; Leo T. Bailey, both of Cuyahoga Falls; Richard E. Hudgins, Wadsworth, all of Ohio

[73] Assignee: The General Tire & Rubber Company, Ohio

[21] Appl. No.: 92,017

[22] Filed: Nov. 7, 1979

[51] Int. Cl.³ ............................................. B23D 19/08
[52] U.S. Cl. ......................................... 83/187; 82/71; 82/91; 83/482; 83/564
[58] Field of Search ......................... 83/187, 482, 564; 82/54, 58, 71, 75, 91

[56] References Cited
U.S. PATENT DOCUMENTS
1,406,459  2/1922  King ........................................ 82/91

Primary Examiner—J. M. Meister

[57] ABSTRACT

Apparatus for trimming the end portion of a pneumatic tire carcass ply when the ply is mounted on a carcass building drum includes a cutting tool movable radially with respect to the drum and a backing roller that swings in and out of a position behind the end portion of the carcass ply. The backing roller thus provides a firm back-up for the cutting tool while it is cutting the carcass ply, but the roller can be swung to and out-of-the way position while other operations are performed on the carcass.

3 Claims, 3 Drawing Figures

CARCASS BAND END TRIMMER

This invention relates to the trimming of pneumatic tire carcass plies after they have been applied to a carcass on a building drum. More particularly, the invention relates to an improved cutter that trims the end portion of the carcass without need for an extension ring coaxial with the drum ply to support the end portion.

In the trimming of the end portions of a tire carcass ply after the application and wrapping of the bead rings, a common practice is to move a cutting tool radially inwardly against the end portions, while the end portions are in turn supported on drum extension rings. These drum extension rings are positioned coaxially with the building drum at both ends, and are mounted on the bead setting apparatus which moves them in and out of their positions supporting the carcass band end portions.

A problem with the foregoing trimming apparatus is that coaxial drum extension rings cannot be mounted on certain types of bead ring carriers, because other parts and assemblies for setting the bead rings or for turning down plies around the bead rings are in the way. The present invention solves this problem by providing a retractable backing roller that does not need to be mounted on a bead ring carrier, and can be used to trim the carcass band end portions on any type of building drum with any type of bead setting apparatus.

Of course, backing rollers have been used in the past for the purpose of supporting material while it is being cut. Examples of such rollers appear in U.S. Pat. Nos. 1,634,997; 1,753,406; 3,830,120; 3,989,565; 4,012,972, and 4,092,886. However, none of the backing rollers shown in these patents can be retracted to a position out of the path of the cutter. Moreover, none of these patents deal with the problem of providing a material back-up means for pneumatic tire carcass band trimmer that does not interfere with the bead setting apparatus or with other servicing equipment used in building the tire.

U.S. Pat. No. Re. 29,268, a reissue of U.S. Pat. No. 3,924,503, shows an apparatus for cutting rubberized fabric plies that employs an anvil that cooperates with a rotary cutter to shear long sheets of fabric material on a conveyor. The anvil, together with the rotary cutter is retractable from the path of the material on the conveyor. However, this anvil is not the equivalent of a backing roller because the anvil simply acts as one half of a pair of scissors, while backing means for trimming heavy carcass-ply stock must be in the form of a solid stop against which a knife can press. Thus, fabric cutting mechanisms such as shown in U.S. Pat. No. Re. 29,268 cannot be adapted to trimming the end portions of tire carcasses.

The retractable backing roller of the present invention also differs from the retractable rollers of apparatus used in trimming tire treads, such as shown in U.S. Pat. No. 3,595,295. Retractable rollers are often used to help support and position tires while they are being trimmed; however, these rollers do not function as backing means for the cutter that trims the tire. In fact, such functioning is impossible because both the rollers and the cutters of these tread trimming devices are located on the external side of the tire. Such rollers do not suggest a solution to the problem of providing a suitable backing means for a cutter that trims the end portion of a carcass band, yet does not interfere with the bead setters or other service equipment associated with the building drum.

The present invention solves this problem by providing, for an apparatus that includes a base support located radially outwardly from the end portion of a carcass ply on a building drum, a cutting tool slidably mounted on this base support, and a means for moving the cutting tool radially toward and away from cutting engagement with said end portion, an improved backing means for supporting the radially inward side of the carcass ply end portion that includes (a) a roller engageable with the radially inward side of the carcass ply end portion at a location where the end portion is to be cut by the knife, (b) a shaft rotatably supporting the roller about an axis that is parallel to the axis of the carcass building drum when said roller engages said radially inward side of the carcass ply end portion, (c) means pivotally securing the shaft to the fixed support on which the knife is mounted, this pivotal securing means permitting the shaft to swing about a pivot axis that is substantially perpendicular to said axis of the building drum, and (d) means for swinging the shaft about its pivot axis to carry said roller between a position in which said roller engages said radially inward side of the carcass ply end portion, and a position in which said roller is located axially outwardly from the end of said carcass ply.

Preferably, the apparatus of the present invention also includes a means moving the base support, with the cutting tool and the backing roller carried thereon, radially toward and away from the building drum. With the base support so movable, the cutting tool and the backing roller can be removed most effectively out of the way of the other servicing equipment for the building drum.

Another preferred feature of the invention is a locking means connected to the cutting tool which engages the pivot connection of the shaft holding backing roller when cutting tool is moved forward to its cutting position, thus holding the backing roller locked in its position engaging the radially inward side of the carcass ply end portion.

The present invention and its advantages will be better understood from the following detailed description and the attached drawings, in which.

Figure 1:
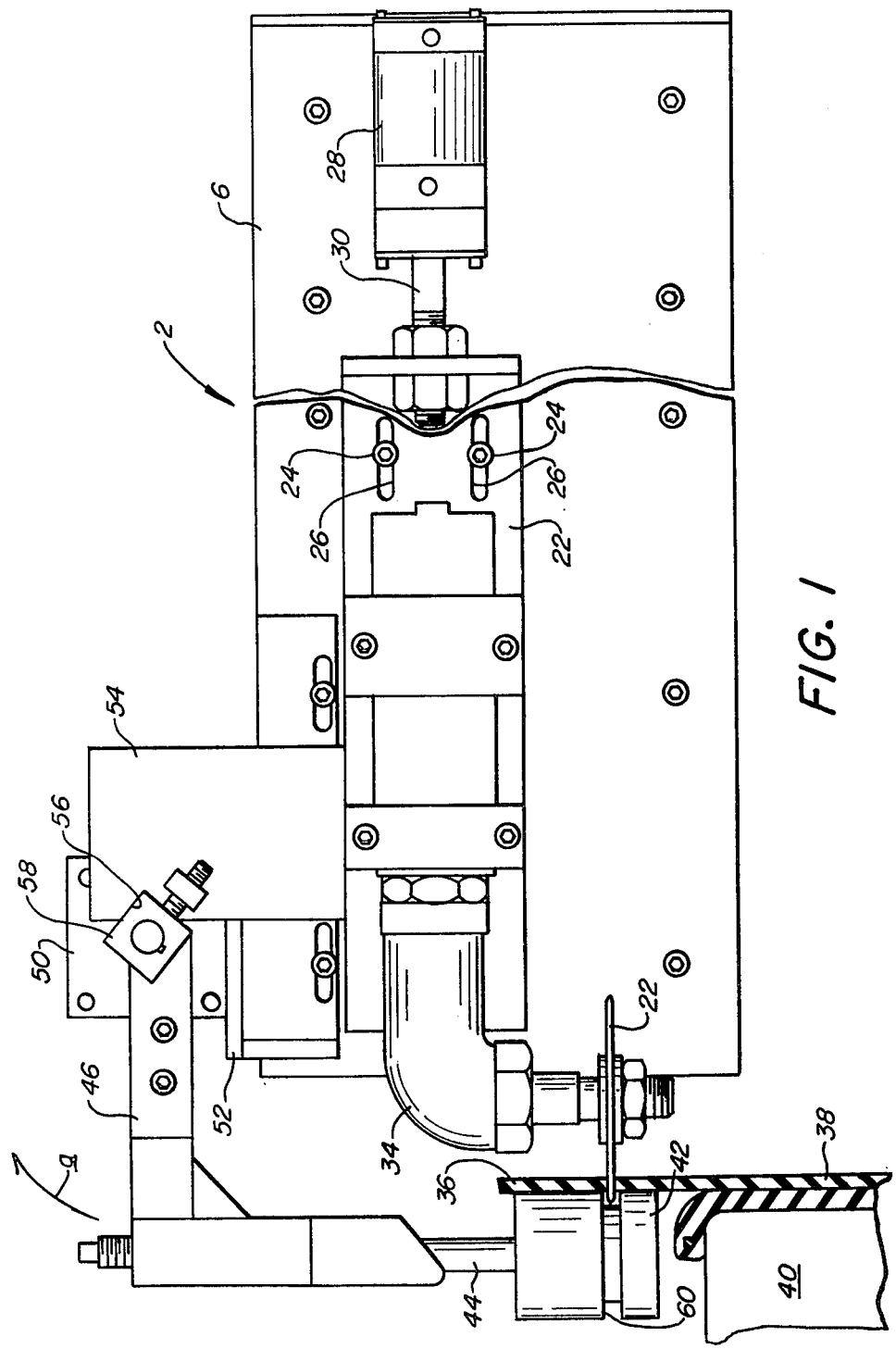
FIG. 1 is a top plan view of an apparatus for trimming the end portion of a pneumatic tire carcass ply, illustrating one embodiment of the present invention.
Figure 2:
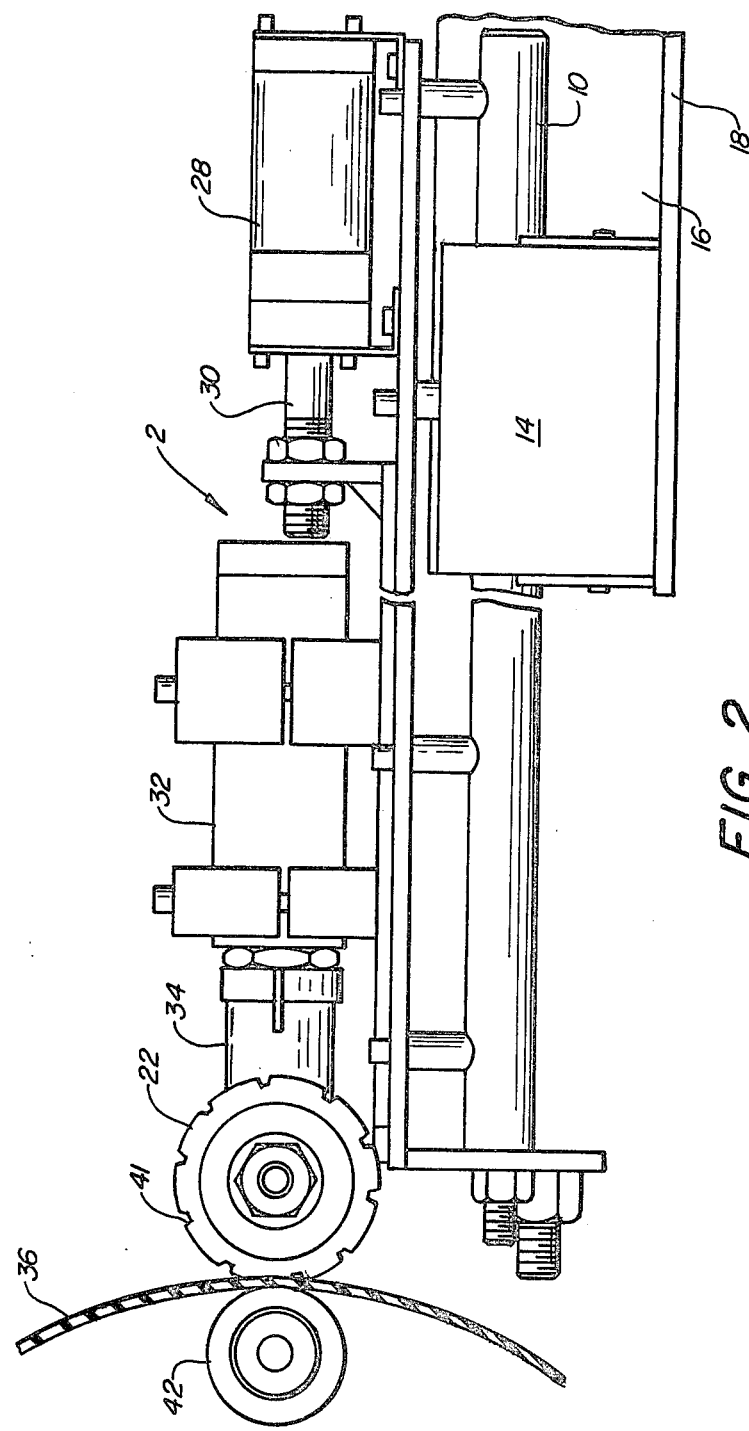
FIG. 2 is a side elevation of the apparatus of FIG. 1.

Referring to FIG. 2, the trimming apparatus 2 includes a base support 4 in the form of a platform 6 with a depending flange 8 on its front left-hand end. On the underneath side of the platform 6 are mounted two guide rods 10 and a central piston rod 12, best seen in FIG. 3. The two guide rods 10 slide in bearings in housings 14, while the piston rod 12 is driven to the right or left, as viewed in FIG. 1, by a hydraulic cylinder 16. The housings 14 and cylinder 16 are mounted on a fixed support 18, and by operation of the cylinder 16, the base support 4 can be moved back and forth with respect to the fixed support 18.

The parts of the apparatus 2 mounted on top of the platform 6 of base support 4 can best be seen in the top plan view of FIG. 1. They include an elongated carriage 20 carrying a rotatable circular cutting tool 22. The carriage 20 slides lengthwise on the platform 6 and is held from lateral movement by pins 24 sliding in slots 26 in the carriage member 20. The carriage 20 is driven lengthwise in either direction by a pneumatic cylinder 28, connected to the carriage 20 by a piston rod 30. An air motor 32 is mounted on the carriage 20 and supports a gear housing 34, holding a gear train, not shown, that connects the cutting knife 20 to the motor 32. The motor 32 thus rotates the cutting knife 20 at a high speed to cut off the end portion 36 of a pneumatic tire carcass band 38 on building drum 40, shown in partial section in FIG. 2. The cutting operation is best performed with a cutting tool 22 that has notches 41.

The cutting tool 22, the gear train in housing 34, the air motor 32, the carriage 20, and the cylinder 16 are all conventional equipment that have been used in the past for cutting the end portions of carcass bands. The improved portion of the apparatus 2 resides mainly in the backing roller 42 and its mounting and positioning means, the details of which will now be described.

Figure 3:
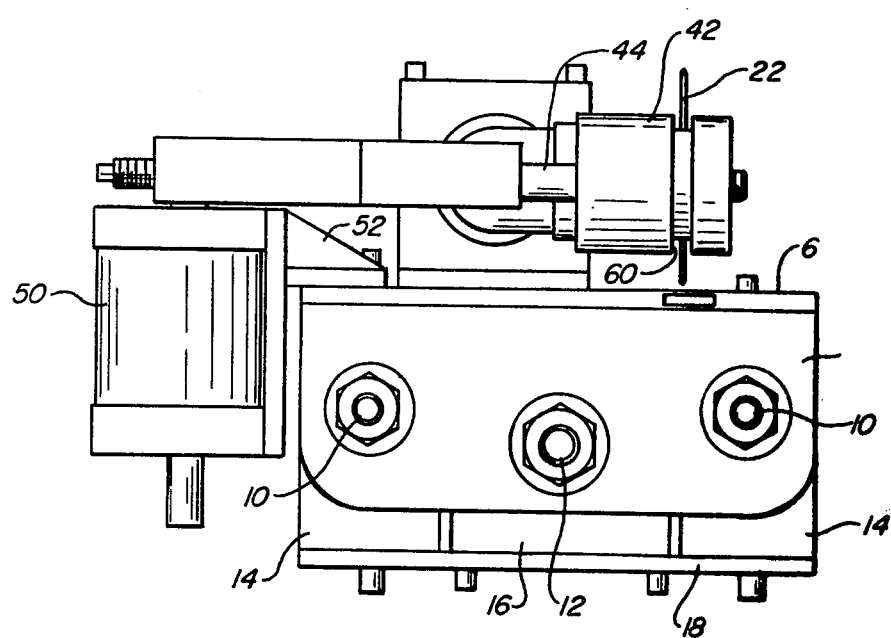
FIG. 3 is a left end elevation of the apparatus of FIGS. 1 and 2, but not showing the end portion of the carcass ply being cut.

As shown in FIG. 1, the backing roller 42 is rotatably mounted on a shaft 44, which is axially parallel to the building drum 40 when the roller 42 is in its operating position, shown in FIGS. 1, 2, and 3 engaging the radially inward side of the carcass ply end portion 36 to be trimmed. The shaft 44 is in turn fixed to an arm 46 that swings on a vertical shaft 48 (FIG. 3) protruding from the top of a rotary air motor 50. The air motor 50 is connected by a bracket 52 to the side edge of the base support 4. By activating the air motor 50, the backing roller 42 can be pivoted about the axis of vertical shaft 48 in the direction of arrow a (FIG. 1), so that it can be moved axially beyond the end portion 36 of the carcass ply 38 when the trimming apparatus is not in use.

Of course, when the cutter 22 is in the process of trimming the carcass band end portion 36, the backing roller 42 should be firmly held in its operative position engaging the radially inward side of the carcass ply end portion 36. For this purpose, the slidable carriage 20 carrying cutter 22 has mounted on its side a locking plate 54 with a notch 56 (FIG. 1). When the carriage 20 is moved forward to bring the cutter 22 into its cutting position, the notch 56 of the locking plate 54 engages a corner of a square shaped connector 58 that connects the arm 46 to the vertical shaft 48. The shaft 48 is thus prevented from rotating and the backing roller 42 is firmly held in its operating position, providing a firm backing for the carcass end portion 36 while the rotating cutter 22 cuts into the end portion.

Another preferred feature of the invention is the groove 60 in the backing roller 42. When the backing roller 42 is in its operating position, the groove 60 is aligned with the cutter 22 and provides a recess in the roller 42 into which the cutter 22 can fit. This allows the cutter 22 to trim the carcass end portion 36 more cleanly, and reduces abrasive contact between the cutter 22 and the backing roller 42.

In operation, the base support 4 is initially in a retracted position with respect to the fixed support 18 (to the right of its position in FIGS. 1 and 2), and the backing roller 42 is rotated to a position axially beyond the end of the carcass end portion 36. Also, the carriage 20 with the cutting tool 22 is retracted on the platform 6 to the right of its position in FIGS. 1 and 2. Thus, both the roller 42 and the cutting tool 22 are in a position removed from the building drum 40 so that the carcass ply 38 can be wrapped on the building drum without interference.

When the carcass ply 38 is ready to have its end portion 36 trimmed, the base support 4 is driven by the cylinder 16 forward and toward the end portion 36, until it reaches the position relative to the carcass ply end portion 36 shown in FIGS. 1 and 2. Since the backing roller 42 is rotated outwardly with respect to the end of the building drum 40, it does not interfere with the end portion 36 as the base support 4 is moved forward.

With the base support 4 so positioned, the motor 50 operates to swing the backing roller 60 into its position engaging the radially inward side of the carcass ply end portion 36, as shown in FIG. 1. Then, the cylinder 28 pushes the cutter 22 into engagement with the opposite side of the carcass ply end portion 36, while the motor 32 rotates the cutter 22 to cut through the carcass ply. The building drum 40 rotates to carry the entire circumference of carcass ply end portion 36 past the cutter 22, thus trimming off the portion of the carcass ply end portion 36 that is axially outside the cutter 22.

When the carcass ply end portion 36 has been trimmed, the cylinder 28 operates to withdraw the cutter 22, the motor 50 swings the backing roller 42 axially outwardly with respect to the building drum 40, and the cylinder 16 operates to pull the base support 4 backward, carrying both the cutter 22 and the backing roller 42 away from the building drum 40. The area around the end of building drum 40 is thus free of all equipment used in trimming the carcass ply end portion, and other equipment may be moved in for further operations on the carcass ply 38.

Naturally, it will be understood that a trimming apparatus of the same design as the apparatus 2 may be placed at the other end of the carcass ply 38. Aside from making the trimming apparatus at each end of the carcass band mirror images of one another, there is no need for design changes in the apparatus, whether it is placed at the inboard or outboard end of the building drum.

While only one embodiment has thus shown and described, other embodiments, and modifications and additions to the apparatus will of course be apparent to those skilled in the art, while remaining within the scope of the appended claims.

We claim:

1. Apparatus for trimming the end portion of a pneumatic tire carcass ply that is mounted on a carcass building drum and has said end portion extending axially beyond the end of said carcass building drum, including a base support located radially outwardly from said end portion of said carcass ply, a cutting tool slidably mounted on said fixed support, means for moving said cutting tool with respect to said base support radially toward and away from cutting engagement with said end portion, and backing means for supporting the radially inward side of said end portion of said carcass ply at the location where said end portion is to be cut by said cutting tool, said apparatus characterized by said backing means including:

(a) a roller engageable with said radially inward side of said end portion at the location where said end portion is to be cut by said cutting tool, (b) a shaft rotatably supporting said roller about an axis that is parallel to the axis of said carcass building drum when said roller engages said radially inward side of said end portion, (c) means pivotally securing said shaft to said base support, said pivotal securing means permitting said shaft to swing about a pivot axis that is substantially perpendicular to said axis of said building drum, and (d) means for swinging said shaft about said pivot axis to carry said roller between a position in which said roller engages said radially inward side of said end portion, and a position in which said roller is located axially outwardly from the end of said carcass ply.

2. The apparatus according to claim 1 characterized further by said roller having a groove in its surface which is engageable with said end portion of said carcass band, said groove extending around the circumference of said roller and being aligned with said knife when said roller engages said end portion.

3. The apparatus according to claim 1 characterized further by said base support being mounted on a fixed support and movable with respect to said fixed support in directions radially toward and away from said building drum, and means for moving said base support in said directions.

* * * * *